Jan. 29, 1957 V. D. VALE 2,779,621
COLLAPSIBLE AUTOMOBILE CAMP TRAILER
Filed Sept. 4, 1953 2 Sheets-Sheet 1

INVENTOR
VERNER D. VALE,
BY
ATTORNEY.

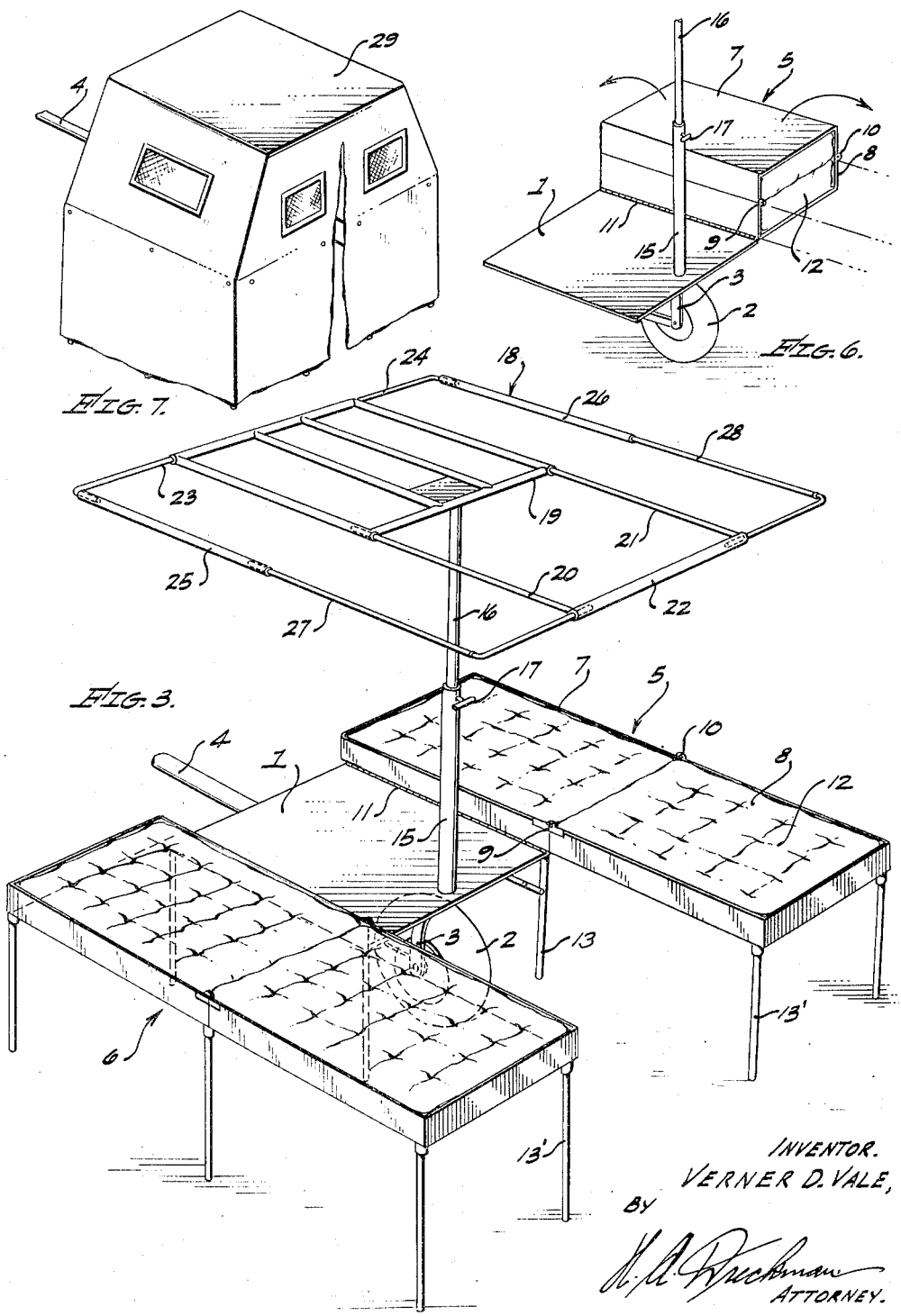

United States Patent Office 2,779,621
Patented Jan. 29, 1957

2,779,621
COLLAPSIBLE AUTOMOBILE CAMP TRAILER

Verner D. Vale, Anaheim, Calif., assignor to Smithvale Engineering and Manufacturing Corporation, a corporation of California Application September 4, 1953, Serial No. 378,583

1 Claim. (Cl. 296—23)

This invention relates to a one wheel automobile trailer which can be easily folded to a size materially less than the normal tread of an automobile, and also its height and length are such that it will not interfere with the rear view from the automobile.

An object of my invention is to provide a one wheel trailer in which two bed frames are provided which can be unfolded to a full length cot or bed.

Another object of my invention is to provide a novel one wheel trailer including a collapsible or foldable roof frame which supports a canvas tent or covering.

Another object of my invention is to provide a novel one wheel trailer in which the roof frame can be raised or lowered, as well as collapsed or folded, thus enabling the roof frame to be lowered to a position where it rests on the top of the folded bed frames.

A feature of my invention is to provide a one wheel trailer of the character stated, which is light and can be easily towed by an automobile, and also one which will easily follow a track with the pulling automobile.

A further feature is to provide a one wheel trailer which can be easily unfolded for use and folded for transport in a minimum amount of time and with very little effort.

Other objects, advantages and features of invention may appear from the accompanying drawings, the subjoined detailed description and the appended claim.

In the drawing:

Figure 3 is a perspective view of my one wheel trailer in unfolded position.

Figure 6 is a perspective view of the one wheel trailer showing one of the bed frames in partly folded position.

Figure 7 is a perspective view of the tent covering for the trailer.

Figure 1:
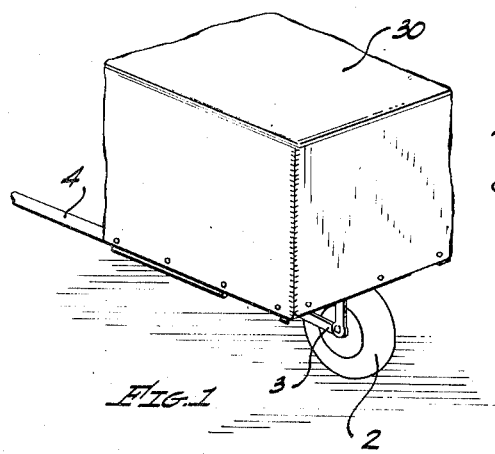
Figure 1 is a perspective view of my one wheel trailer in folded position.

Referring more particularly to the drawing, a platform 1 is supported on a single wheel 2 which is supported from the platform by a fork or yoke 3. A tongue or draw bar 4 is attached to the platform 1 in a suitable manner and is affixed to the towing automobile in the usual and well known manner, not shown. On each side of the platform 1 there is mounted a bed frame 5 and 6 and the construction of both of these bed frames is identical. Only one will, therefore, be described in detail.

The bed frame consists of two rectangular sections 7 and 8 which are hinged together by suitable hinges 9—10. The sections 7 and 8 are both open at the top, that is, they are provided with side walls and a bottom, but no top. The section 7 of each bed frame is hingedly secured to one side edge of the platform 1 by means of the hinge 11. A mattress 12 is mounted in each of the bed frames and this mattress is so constructed that it will hinge or part on the line between the hinges 9—10 so that the mattress will effectively fold with the two bed frame sections 7 and 8. Four legs 13 are hingedly attached to the bottom of the platform 1 and when these legs are extended they serve to support the platform in a rigid horizontal position. The bed frames 5—6 are each supported by suitable legs 13' which preferably screw into a fitting 14 attached to the bottom of the sections 7 and 8 of the bed frame. Thus when the bed frames are extended, as shown in Figure 3, these frames are rigidly supported and will sustain the weight of a person.

Figure 4:
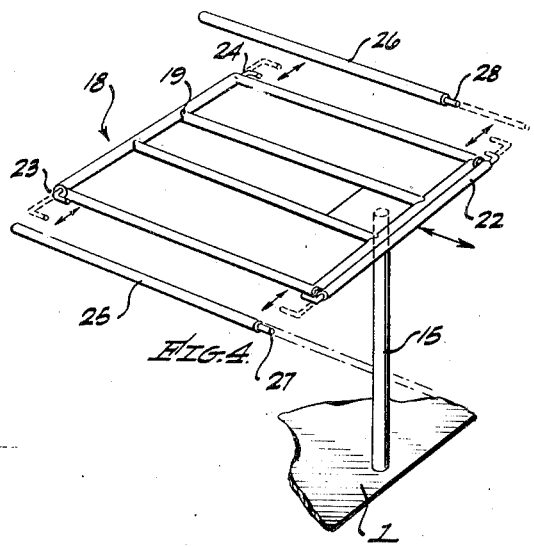
Figure 4 is a disassembled view of the roof frame illustrating the movement of the various parts thereof.
Figure 2:
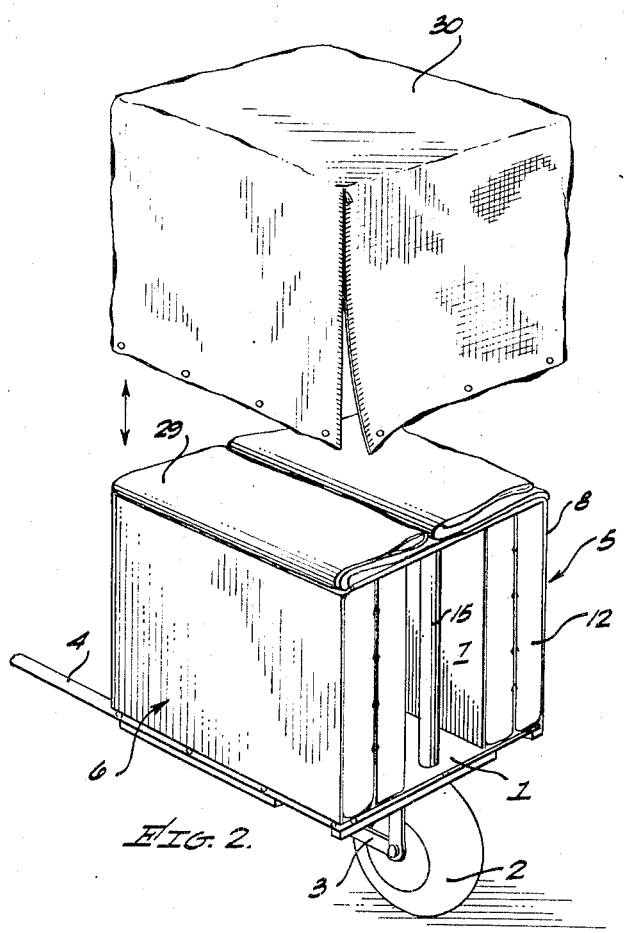
Figure 2 is a perspective view of the same showing the dust cover removed.
Figure 5:
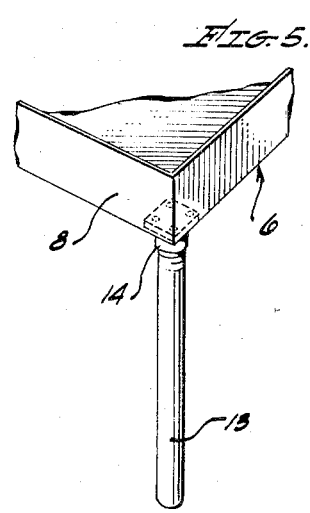
Figure 5 is a fragmentary perspective view of one of the bed frames and showing a supporting leg.

To provide an effective housing or tent covering for the bed frames 5 and 6, I provide a tubular post 15 which is welded or otherwise fixedly secured to the platform 1. A rod 16 telescopes into the post 15 and is held in either raised or lowered position by the set screw 17. The roof frame 18 is preferably formed of hollow tubes or pipes and consists of a rectangular portion 19 which is fixedly secured to the rod 16, that is, these parts may be welded together. Extension rods 20 and 21 telescope into the frame 19 and at their outer ends are fixedly attached to the tube 22. Additional extension rods 23—24 telescope into the frame 19 and are secured at their outer ends to the tubes 25 and 26, respectively, and these tubes in turn receive the rods 27—28, respectively, which latter also telescope into the tube 22. Thus the roof frame can be extended, as shown in Figure 3, or collapsed, as shown in Figure 4, by simply pulling the various telescopically mounted parts either outwardly or by pushing them inwardly. Thus a rectangular roof frame is provided upon which a canvas covering 29 can rest. This canvas cover can be folded and packed on top of the bed frames 5 and 6 when the bed frames are folded, as shown in Figure 2. The canvas cover 29 can be formed as several panels, the various panels being secured together by separable fasteners of a suitable type. A dust cover 30 fits over the bed frames and the tent cover and this dust cover again can be provided with separable fasteners to attach the cover in position, as may be necessary.

Having described my invention, I claim:

In an automobile trailer including a rectangular platform having a supporting wheel mounted on the platform, of a pair of bed frames, each of said frames including two rectangular sections, means hingedly securing said sections together at two abutting edges thereof whereby a full length bed frame is provided, means hingedly securing one of the sections of each bed frame to an edge of the platform, the last named section being movable on the platform from a vertical to a horizontal position, and supporting legs on each of said sections to support the sections in their unfolded position, a horizontal roof frame including a tubular center portion, extension rods slidably mounted in the center portion, a tubular post rising vertically from said platform, and a vertical rod depending from said roof frame and telescoping into said post, said post being substantially the same height as the bed frames when in vertical position, said roof frame in lowered position being substantially level with the top of the bed frames when in vertical position.

References Cited in the file of this patent

UNITED STATES PATENTS

| | | |
|---|---|---|
| 1,156,631 | Schaick | Oct. 12, 1915 |
| 1,214,979 | Von Ahnen | Feb. 6, 1917 |
| 1,280,840 | Reid | Oct. 8, 1918 |
| 1,581,858 | Musgrave | Apr. 20, 1926 |
| 1,861,548 | Peck | June 7, 1932 |
| 2,080,709 | Hall et al. | May 18, 1937 |
| 2,503,482 | Hamilton | Apr. 11, 1950 |
| 2,640,721 | Kors | June 2, 1953 |

FOREIGN PATENTS

| | | |
|---|---|---|
| 11,395 | Australia | Dec. 19, 1928 |
| 798,110 | France | Mar. 2, 1936 |
| 296,265 | Great Britain | Aug. 30, 1928 |